Sept. 9, 1952 J. A. LOVE 2,609,742
PLOW
Filed Oct. 25, 1946
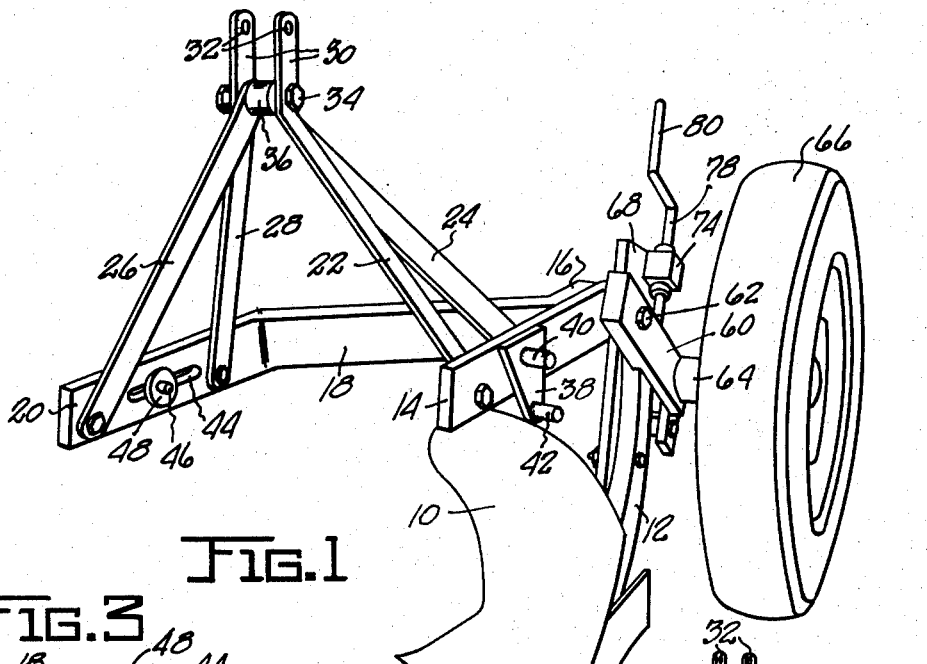
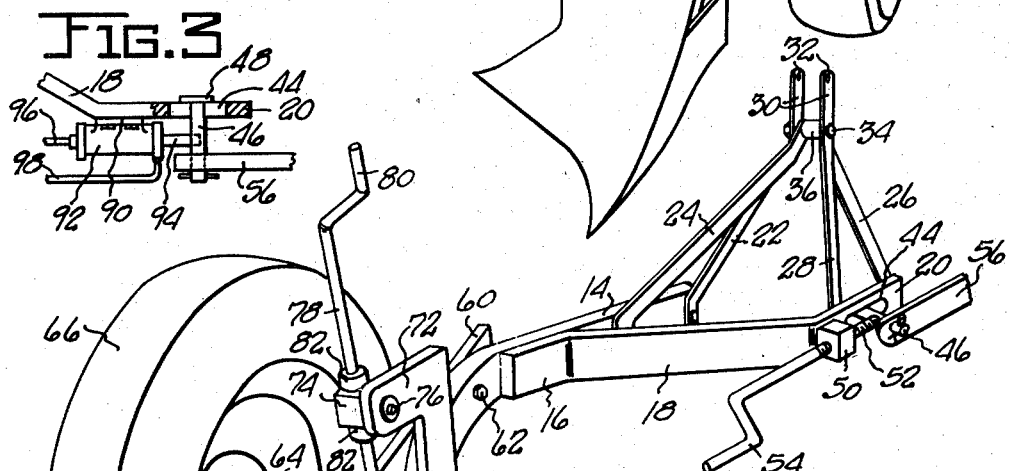
JABEZ A. LOVE,
INVENTOR.
BY Altich & Knoblock
ATTORNEYS.

Patented Sept. 9, 1952

2,609,742

UNITED STATES PATENT OFFICE 2,609,742

PLOW

Jabez A. Love, Eau Claire, Mich.

Application October 25, 1946, Serial No. 705,656

4 Claims. (Cl. 97—47)

This invention relates to improvements in plows, and more particularly to a plow of the type adapted for connection with a tractor having a power operated implement lifting draft mechanism.

The primary object of the invention is to provide a plow which is rigid and sturdy in construction, which is adapted for three-point connection with a power lift mechanism, and which is simple and easy to manufacture and to use.

A further object of the invention is to provide a plow with novel means for controlling the lateral inclination thereof relative to the lateral inclination of the tractor.

A further object is to provide a device of this character with novel means for adjustably controlling the longitudinal position of the plow relative to the tractive means whereby the angle of attack of the plow share may be varied at will.

A further object is to provide a plow having a novel frame structure providing for a three-point connection with a power lift mechanism carried by a tractor.

A further object is to provide a plow having a novel construction and arrangement of ground engaging depth controlling wheel.

Other objects will be apparent from the following specification.

In the drawing:

Fig. 1 is a front perspective view of the plow.

Fig. 2 is a rear perspective view of the plow.

Fig. 3 is a detail view with parts shown in section of a modified embodiment of the invention.

Referring to the drawing which illustrates the preferred embodiment of the invention, the numeral 10 designates a plow blade which is mounted upon a beam including a bent lower portion 12 and a forwardly extending straight portion 14. The construction of the parts 10 to 14, inclusive, may be of any standard or conventional construction and is of a type of construction which is well understood in the art.

Adjacent the point at which the curved part of the beam merges with the straight part 14 there is rigidly secured thereto, as by welding, securing bolts or any other desired means, a rigid bar having one end portion 16 secured to the member 14, an intermediate portion 18 extending forwardly and divergently from the member 14, and a front end portion 20 extending parallel to and spaced from the member 14. The member 16, 18, 20 preferably lies in the same horizontal plane as the member 14 and cooperates therewith to provide a Y-shaped rigid frame for the plow when viewed in top elevation.

A rigid upwardly projecting structure is carried by the forward end of the Y-shaped plow frame and is preferably formed of members 22 and 24 which are welded, bolted or otherwise rigidly secured in longitudinally spaced relation along the member 14 and of members 26 and 28 which are similarly rigidly secured to the frame part 20. The members 22 and 24 converge upwardly and are preferably inwardly inclined. The members 26 and 28 similarly converge upwardly and may likewise be inclined inwardly. One member of each set of converging bars, here illustrated as the members 22 and 28, respectively, project upwardly above the point of juncture with the corresponding member of the set to provide substantially parallel upwardly projecting bar parts 30 which are provided at their upper ends with axially aligned openings 32 whose axis extends transversely of the longitudinal plow beam part 14. The parts 22, 24, 26 and 28 are interconnected at their upper ends by means of a suitable bolt and nut assembly 34, and the members of each set are spaced apart by a spacer 36 encircling the bolt and controlling the spacing of the upwardly projecting parts 30.

One of the parts of the Y-frame of the plow, here illustrated as the member 14, has rigidly secured thereto at its outer surface and in rearwardly spaced relation to its forward end, a rigid plate 38 which projects therebelow. A pin 40 projects outwardly from the plate 38 adjacent the upper end thereof and a second pin 42 projects outwardly from the lower end portion of the plate 38. The pins 40 and 42 preferably extend perpendicularly to the member 14 and parallel to each other and are spaced apart vertically a distance of approximately six inches, although this spacing may vary and has been given as illustrative only and not as a limitation. In the preferred arrangement, the plate 38 will be so located that the vertical plane common to the axes of the pins 40 and 42 will substantially coincide with the axis of the openings 32. It will be understood, however, that, if desired, the plate 38 may be positioned either forwardly or rearwardly from such a position.

The opposite forward arm portion 20 of the plow frame is provided with a central elongated slot 44 which is adapted to receive an elongated pin 46 slidable freely therein. Any suitable means, such as a shoulder or washer 48, may be mounted upon one end of the pin 46 to prevent excessive longitudinal play of said pin in a direction transverse of the frame member 20. A block 50 is secured rigidly to the member 20 in rearwardly spaced relation to the slot 44 and has a longitudinal screw-threaded bore therethrough adapted to receive a screw-threaded member 52 which terminates at one end in a crank 54. The end of the member 52 opposite the crank 54 is connected with an intermediate portion of the pin 46. The pin 46 is adapted for pivotal connection of a link 56 thereto, said link constituting one part of a power operated lift mechanism of the three-point type and of any specific construction desired. One form of construction of an implement hitch, of which the link 56 may constitute a part, is illustrated in my co-pending application for implement hitch, Ser. No. 687,839, filed August 2, 1946, now Patent No. 2,445,145, issued July 13, 1948, and another implement hitch of which the link 56 may comprise a part is the type known as the Ford-Ferguson implement hitch. It will be understood in this connection that a link, similar to link 56 but not shown herein, is adapted to be attached selectively to one of the pins 40, 42, and a third link of such a hitch is adapted to be connected to the members 30 by a bolt or other securing means passing through the openings 32 in the members 30. It will be observed that by operation of the crank 54 the position of the pin 46 lengthwise of the member 20 may be adjusted through a range determined by the length of the slot 44 receiving said pin.

A bar 60 is pivoted at 62 to the plow frame at the upper end of the bent portion 12 of the frame and extends rearwardly and downwardly therefrom in its normal adjustment. The rear end of the bar 60 mounts an axle 64 for a wheel 66 which is here shown as a rubber tired vehicle wheel of approximately the same size and construction as a conventional automobile or truck wheel. Another bar 68 is secured to the plow frame portion 12 at 70 rearwardly of and below the pivot point 62 and projects vertically above the rear portion of the plow frame to terminate in a rearwardly extending projection 72 integral with the member 68 and constituting therewith a unit of inverted L-shape. A block 74 is pivoted to the extension 72 at 76. The block 74 has a bore therethrough receiving rotatably the shank portion 78 of a crank having a crank handle 80. Spacers 82 on the crank shaft 78 position the crank shaft with respect to said block. A projection 84 extends downwardly from the rear portion of the member 60 and pivotally mounts a block 86 which has a screw-threaded bore therethrough adapted for screw-threaded engagement with a screw-threaded portion 88 on the crank shaft 78. It will be observed that by this arrangement the elevation of the wheel 66 with respect to the plow blade 10 may be adjusted at will through the range provided by the length of the screw-threaded portion 88 of the crank 78.

In the use of the plow it is connected through the implement hitch (not shown) to the tractor (not shown) in the manner hereinabove described, that is, the link 56 of the hitch is attached to the pin 46, a similar link is attached to one of the pins 40 and 42, and a third link is attached to the member 30 by a pin passing through the openings 32. When so connected the operation of the hitch mechanism serves to raise and lower the implement so that it is possible to raise the implement clear of the ground as when the tractor with the plow attached thereto travels along paved highways, or the like, in traveling to and from the field to be plowed and the barn or implement shed on a farm. It will be observed in this connection that the members 22, 24, 26, 28 constitute a rigid cross braced, upwardly projecting, A-shaped frame as a projection above the plow frame so that the vertical swinging of the links, such as the link 56 of the implement hitch, will produce the desired elevation of the plow and will permit the plow to be held in any desired angular or tilted position when so elevated.

When the first furrow is being plowed in a field the link of the hitch, which is a companion link to link 56 shown, is attached to the upper pin 40 so that it will be at substantially the same level at the end connected to the plow as is the rear end of the link 56 which is connected to pin 46. In this connection it will be apparent that when the first furrow is being plowed, the wheels of the tractor will both be positioned at ground level and there is no tendency for the parts to incline laterally. After the first furrow has been plowed, the succeeding plowing operations will entail or necessitate the riding of one of the tractor wheels in the previously plowed furrow, whereby the tractor rides in a laterally tilted position. It is desirable, however, that this lateral tilted position of the tractor shall not be transferred to the plow and that the bottom surface of the plow shall be horizontal. This is accomplished with the instant construction by disconnecting the lower link extending alongside the member 14 from the pin 40 and connecting it to the lower pin 42. In this connection in the relation of the parts as viewed, the frame part 20 will be at the side of the plow adjacent the wheel which rides in the preceding furrow at a lower level than the wheel of the tractor at the side adjacent the plow frame member 14. Consequently, the rear ends of the lower links, when attached respectively to the pin 46 and the pin 42, will be at substantially the same level, and the bottom of the plow 10 will be substantially horizontal, even though the tractor with its three-point connection is laterally inclined.

The function of the crank 52, 54 is to regulate the longitudinal position of the pin 46 with respect to the pins 40 and 42 for the purpose of controlling the longitudinal position of the plow frame and thereby controlling the angle of attack of the plow blade 10. The range of adjustment possible serves additionally, in conjunction with the choice of the link connection as between pins 40 and 42, to provide the desired attitude of the plow blade 10.

The rear structure, including the adjustment for the ground engaging wheel 66, provides means by which the depth of the furrow may be controlled in instances where that depth is desired to be controlled directly from the ground rather than solely from the position of the implement hitch including the arm 56. The adjustment may be varied within a wide range sufficient to accommodate all desired variations of depth of furrow as different soil conditions are encountered, or for any other reason, as is well understood in the agricultural arts.

It will be observed that the plow is rigid and sturdy, serves admirably for use with power lift mechanisms, has a wide range of adjustment to assure any desired attitude of the plow blade, provides a quick means for changing the adjustment of the plow with reference to the tractor as is required after a first furrow has been completed and before succeeding furrows are plowed, and is applicable to any type of implement hitch providing a three-point connection between the tractor and the implement. All necessary adjustments can be made easily and simply and any condition which is encountered in plowing can be met by one of the adjustments which the device provides.

Fig. 3 illustrates a modified embodiment of the invention wherein the part 20 of the frame of the plow which has the elongated slot 44 therein mounts by means of a bracket 90 a double-acting cylinder piston unit 92. The rod 94 of the piston of the unit 92 projects from one end of the cylinder and is secured to the pin 46 intermediate its headed end 48 and the end at which the link 56 is connected. A pair of fluid pressure lines 96 and 98 are connected at opposite ends of the unit 92. These conduits preferably include a flexible portion and extend to a control valve (not shown) mounted upon the tractor by which the plow is adapted to be drawn. Such a valve will be interposed in a fluid pressure system, such as a hydraulic system, with which a tractor having a lift type hitch mechanism is commonly provided, as is well understood in the art.

It will be apparent that if the unit 92 is of the double-acting type, it will be possible during the operation of the plow to adjust the angle of attack of the plow blade by simply operating the control valve in a manner to actuate the unit 92 in proper direction to shift the cross-pin 46 either forwardly or rearwardly in the frame slot 44. Thus the adjustment of the plow to meet varying working conditions can be made by this mechanism while the plow operation continues and without requiring the necessity of stopping the tractor and without necessitating manual manipulation of connecting parts by the operator such as must commonly be performed after he has climbed down to the ground from his seat upon the tractor. One condition in which this type of adjustment will be particularly desirable will be for hillside or contour plowing where it is necessary to change the longitudinal attitude of the plow blade to prevent lateral movement of the plow in a down-grade direction. It will be apparent that longitudinal adjustment of this type must be made alternately for each succeeding furrow plowed along a hillside because the setting which will be proper to avoid lateral deflection of the plow blade when the plow is traveling one direction will tend to increase the likelihood of lateral deflection of the plow in a downhill direction when the plow is traveling in the opposite direction. Therefore it will be apparent that any manual adjustment which requires the operator to stand on the ground away from the tractor is time-consuming and objectionable, and the power cylinder arrangement avoids the necessity for stopping the plowing operation to make the desired setting of longitudinal attitude of the plow blade.

While the plow has been illustrated and described herein as providing only a single plow blade, it will be understood that more than one plow blade can be mounted upon the frame of the structure and that two or more plow blades may be employed positioned in laterally spaced relation and in any desired longitudinally spaced relation with respect to each other. For example, where two plow blades are employed, one thereof may be mounted upon a beam extending rearwardly from the portion 20 of the frame. Where more than two plow blades are desired, lateral frame extensions comparable to the parts 16, 18, 20 may be employed.

It will be understood that while only one embodiment of the invention has been herein described, the plow may be altered within the scope of the appended claims without departing from the spirit of the invention.

I claim:

1. In a plow adapted for attachment to an implement hitch having a pair of laterally spaced hitch arms, a rigid blade-carrying frame including a pair of laterally spaced longitudinal members, one of said members having a longitudinal slot adjacent its front end, a rigid attachment member adapted for connection to one hitch arm and extending transversely through and slidable in said slot, means for anchoring said member in selected position longitudinally in said slot, and a pair of attachment members secured in vertically spaced relation to the other frame member and adapted selectively for attachment to the other hitch arm.

2. In a plow adapted for attachment to an implement hitch having a pair of laterally spaced hitch arms, a rigid blade-carrying frame including a pair of laterally spaced longitudinal members, one of said members having a longitudinal slot adjacent its front end, a rigid attachment member adapted for connection with one hitch arm and extending transversely through and slidable in said slot, means for anchoring said member in selected position longitudinally in said slot, and a pair of attachment members secured in vertically spaced relation to the other frame member and selectively attachable to the other hitch arm, said anchoring member comprising a projection carried by said slotted frame member and having a screw-threaded bore parallel to said slot, and a screw-threaded shaft adjustable in said bore and connected to said attachment member.

3. In a plow, a rigid blade-carrying frame including a pair of laterally spaced longitudinal members, one of said members having a longitudinal slot therein, a rigid pin extending transversely through and slidable in said slot, a screw-threaded shaft parallel to said slot and journaled at one end at an intermediate portion of said pin, and a projection on said frame part adjacent one end of said slot having a tapped bore receiving said shaft.

4. In a plow, a rigid blade-carrying frame including a pair of laterally spaced longitudinal members, one of said members having a longitudinal slot therein, a rigid pin extending transversely through and slidable in said slot, a screw-threaded shaft parallel to said slot and journaled at one end at an intermediate portion of said pin, and a projection on said frame part adjacent one end of said slot having a tapped bore receiving said shaft, said means on the end of said pin opposite from said shaft providing an abutment adapted for sliding engagement with said slotted frame member.

JABEZ A. LOVE.

REFERENCES CITED

The following references are of record in the file of this patent:

UNITED STATES PATENTS

| Number | Name | Date |
|--------|------|------|
| 1,379,399 | Ferguson | May 24, 1921 |
| 1,501,651 | Ferguson | July 15, 1924 |
| 1,637,811 | Ferguson | Aug. 2, 1927 |
| 1,916,945 | Ferguson | July 4, 1933 |
| 2,195,515 | Ferguson | Apr. 2, 1940 |
| 2,322,342 | Bunn | June 22, 1943 |
| 2,359,121 | Kinnan | Sept. 26, 1944 |
| 2,386,378 | Wippel | Oct. 9, 1945 |
| 2,465,641 | Gardner | Mar. 29, 1949 |
| 2,527,613 | Zagurski | Oct. 31, 1950 |